(12) United States Patent
Boatright

(10) Patent No.: US 12,043,779 B2
(45) Date of Patent: Jul. 23, 2024

(54) STRUCTURED PHOSPHATE LUMINOPHORES AND STRUCTURED METAL LUMINOPHORES AND THEIR USE IN THE DETECTION OF HYDROPEROXIDES USING CHEMICALLY-STIMULATED LUMINESCENCE

(71) Applicant: University of Kentucky Research Foundation, Lexington, KY (US)

(72) Inventor: William L. Boatright, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 17/833,490

(22) Filed: Jun. 6, 2022

(65) Prior Publication Data

US 2022/0389311 A1 Dec. 8, 2022

Related U.S. Application Data

(60) Provisional application No. 63/197,593, filed on Jun. 7, 2021.

(51) Int. Cl.
| | | |
|---|---|---|
| *C09K 11/08* | (2006.01) | |
| *C09K 11/70* | (2006.01) | |
| *C09K 11/77* | (2006.01) | |
| *G01N 21/76* | (2006.01) | |

(52) U.S. Cl.
CPC ...... *C09K 11/0861* (2013.01); *C09K 11/0855* (2013.01); *G01N 21/76* (2013.01)

(58) Field of Classification Search
CPC ............ C09K 11/0861; C09K 11/0855; C09K 11/0872; C09K 11/701; C09K 11/703; C09K 11/71; C09K 11/70; C09K 11/7709; C09K 15/32; C09K 15/322
See application file for complete search history.

(56) References Cited

U.S. PATENT DOCUMENTS

| | | | |
|---|---|---|---|
| 7,704,752 | B2 | 4/2010 | Akhavan-Tafti et al. |
| 8,628,753 | B2 | 1/2014 | Murthy et al. |
| 9,194,808 | B2 | 11/2015 | Yamaguchi et al. |
| 9,915,670 | B2 | 3/2018 | Olivo et al. |
| 10,788,426 | B2 | 9/2020 | Boatright |
| 10,794,830 | B2 | 10/2020 | Boatright |
| 2019/0000973 | A1* | 1/2019 | Koyakutty ......... A61K 41/0052 |

FOREIGN PATENT DOCUMENTS

| | | | |
|---|---|---|---|
| RU | 2700708 C1 | 9/2019 | |
| WO | WO-2017131540 A2 * | 8/2017 | ............. A61K 35/30 |

* cited by examiner

*Primary Examiner* — Matthew E. Hoban
*Assistant Examiner* — Lynne Edmondson
(74) *Attorney, Agent, or Firm* — Dinsmore & Shohl LLP

(57) ABSTRACT

This disclosure relates to inorganic structured metal luminophores for the detection of peroxides and/or free radicals in proximity thereto. The disclosure includes the application of inorganic phosphates or mixtures thereof with one or more metal components that provides a structured metal luminophore capable of providing real-time detection and/or measurement of the presence of peroxides and/or free radicals in an environment proximal to the structured metal luminophore.

17 Claims, 4 Drawing Sheets

STRUCTURED PHOSPHATE LUMINOPHORES AND STRUCTURED METAL LUMINOPHORES AND THEIR USE IN THE DETECTION OF HYDROPEROXIDES USING CHEMICALLY-STIMULATED LUMINESCENCE

RELATED APPLICATIONS

This application claims priority to U.S. Provisional Patent Application 63/197,593, filed Jun. 7, 2021, the content of which is hereby incorporated by reference in its entirety.

GOVERNMENT SUPPORT

The present disclosure was supported by a grant from the United States Department of Agriculture (Grant No. KY007106) and the United States Department of Agriculture National Institute of Food and Agriculture Small Business Innovation Research Program (Grant No. 2020-33610-31693). The Government may have rights to the invention.

FIELD OF THE INVENTION

This disclosure relates to scaffolds that allow for the formation of structured phosphate luminophore sensors and structured metal phosphate luminophore sensors that emit luminescence proportionally to the concentration of peroxides or free radicals in a material resulting from oxidative reactions or peroxide containing admixture.

BACKGROUND

The industry standard for measuring levels of oxidation in agricultural products (e.g., edible fats and oils), petrochemicals and pharmaceuticals is the peroxide value (PV). These methods include the American Oil Chemists Society (AOCS) (official method Cd 8b-90), Association of Official Analytical Chemists (AOAC) 965.33, the International Union of Pure and Applied Chemistry (IUPAC) 2.501, the International Organization for Standardization (ISO) 3960: 2017 and U.S. Pharmacopeia Convention methods (USP) 401. All these official methods are iodometric titration procedures that require laboratory glassware, the use of flammable and toxic solvents that are expensive to purchase and dispose of as hazardous waste, suffers from lack of sensitivity and poor endpoint determination and requires trained personnel. The iodometric titration takes about 5 minutes to conduct, but reagent preparation and clean-up of oily glassware mixed with isooctane (or chloroform) and glacial acetic acid makes the assay a time consuming and expensive technique.

Prior studies have identified that phytic acid (or inositol hexakisphosphate) can be utilized as a scaffold to retain zinc and manganese in place and allow a luminescence response when in the presence of free radicals or peroxides. See, e.g., U.S. Pat. Nos. 10,794,830 and 10,788,426. In particular, the phytic acid scaffold presented a structure to provide for monitoring of free radicals or peroxides in edible oils. However, while the prior work demonstrated good luminescence in response to the presence of peroxides and the like, the presence of an organic scaffold remains troublesome in cost, functionality, and ease of manufacturing. There is, therefore, a need for an inorganic material that can similarly provide the structure and support to retain the structured lumiphore materials and provide the luminescent response.

DETAILED DESCRIPTION

The present disclosure concerns a structured phosphate luminophore (SPL) of a phosphate scaffold material. In some aspects, the current disclosure concerns a phosphate scaffold that replaces the organic phytic acid scaffold to retain one or more metals as a structured metal phosphate. In some aspects, the present disclosure concerns a phosphate scaffold that retains metals and will luminesce or emit electromagnetic radiation in the presence of a free radical or a peroxide. In some aspects, the phosphate scaffold includes a mixture of two or more phosphates. In further aspects, the present disclosure concerns methods of using or applying the scaffolds as set forth herein to measure and/or detect the presence of a peroxide or free radical in a liquid environment and/or admixture.

Figure 1A:
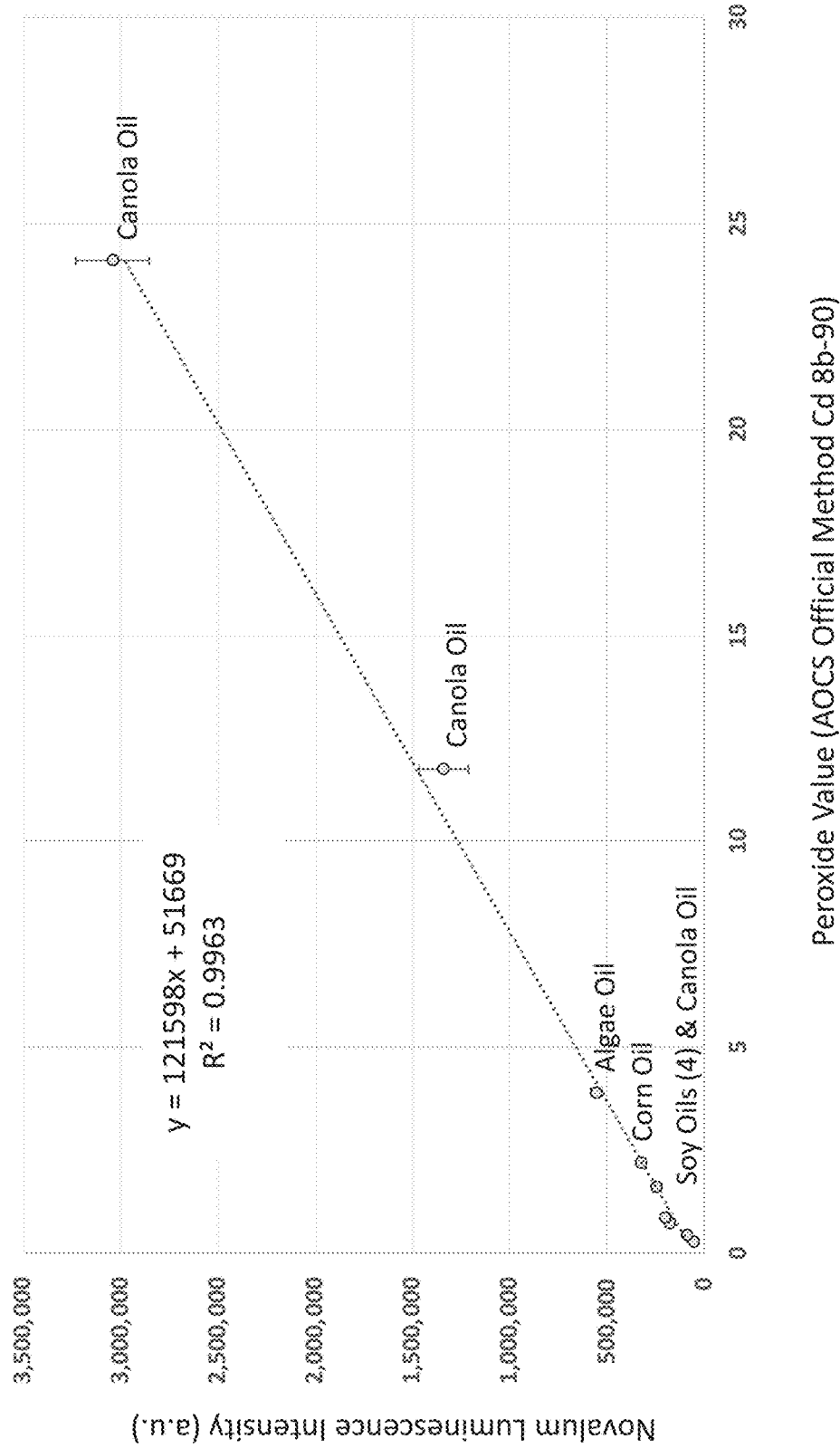
FIG. 1A shows a plot of luminescence intensity at 1.5 minutes after mixing 400 µL of various edible oils with 10 mg of structured metal phosphate luminophore (MPL) sensor. All materials are at 22 degrees C. Luminescence is measured with a Charm Sciences Novalum II-X luminometer. Error bars show standard errors (n=3). The "peroxide value" of each oil was measured using AOCS Official method Cd 8b-90.
Figure 1B:
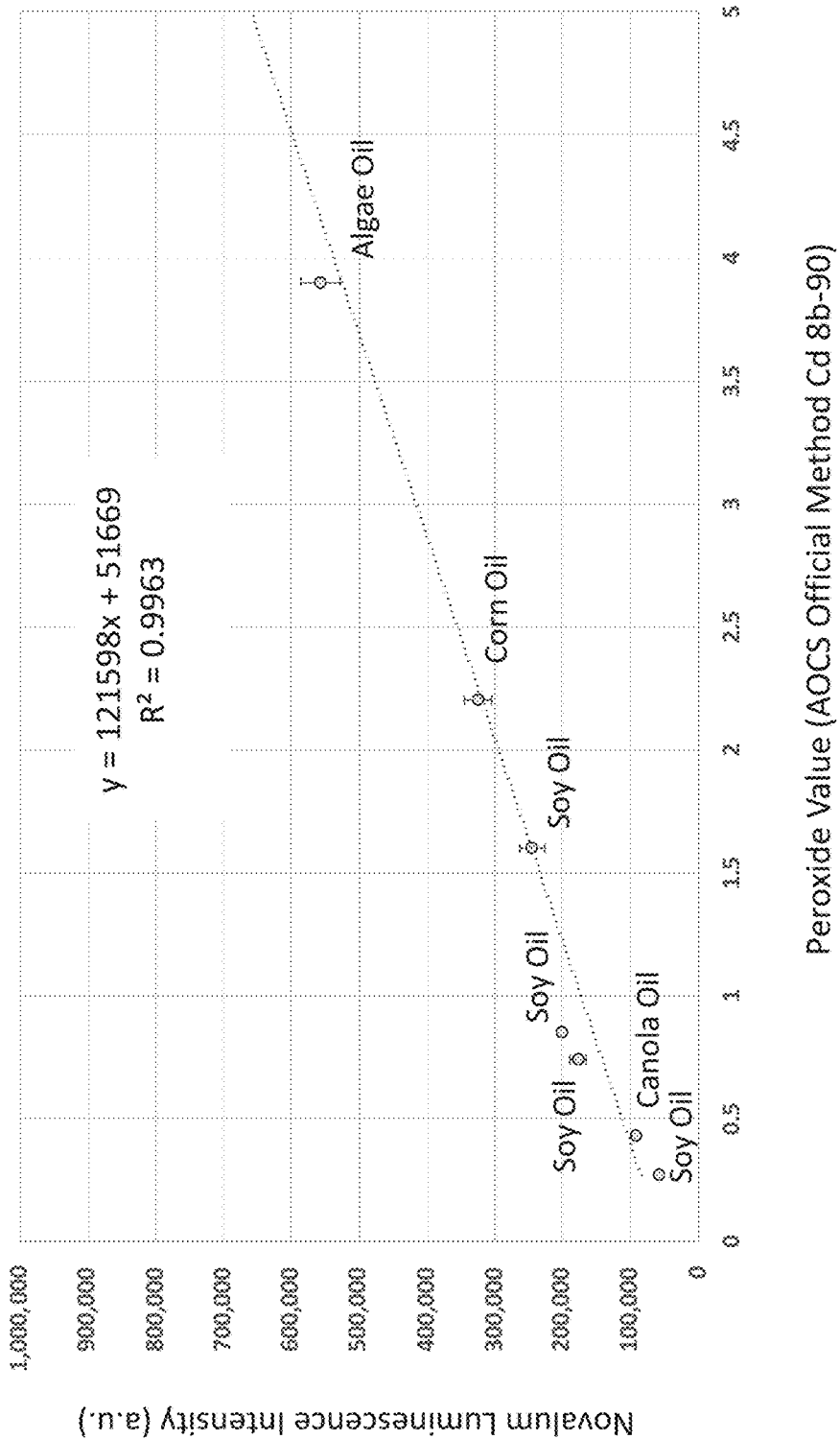
FIG. 1B shows a segment of the same data presented in FIG. 1A highlighting the lower PV range of zero to 5.

In some aspects, the present disclosure concerns a structured phosphate luminophore (SPL) of a phosphate scaffold of a phosphate component. In some aspects, the phosphate scaffold may also include a metal component. As set forth herein, a phosphate component may include one or more phosphates. In some aspects, a phosphate component may include one or more inorganic phosphates. As described herein, an inorganic phosphate or a combination of inorganic phosphates can arrange to provide a scaffold. In some aspects, the scaffold can retain or bind a metal component therein to form a structured metal phosphate luminophore (SML). Through holding the metal components in place, the presence of a free radical or peroxide can interact therewith. As set forth in FIG. 1A and FIG. 1B, the metal component can interact with the free radical or peroxide and the energy transfer from the interaction can result in emission of electromagnetic radiation, which can be detected and the detection thereof identifies the presence of a peroxide or free radical in proximity to the structured metal luminophore.

In some aspects, the present disclosure concerns an SPL and/or a SPL of one or more inorganic phosphates or an inorganic phosphate component of a mixture of inorganic phosphates. An inorganic phosphate can include any mono- or poly-phosphoric acid, including pyrophosphate, tripolyphosphate, tetrapolyphosphate, and/or metaphosphoric acid molecules. In some aspects, a metaphosphate may include a cyclic or ring structure and/or a chain, and/or a branched chain and/or an ultraphosphate combination of cyclic and branched arrangement of phosphates. A ring or cyclic arrangement of phosphates may be of about 3 to about 20 phosphates arranged to form a circular closed shape, including about 5, 6, 7, 8, 9, 10, 11, 12, 13, 14, 15, 16, 17, 18, and 19 phosphates to a ring. In some aspects, the phosphates may include a closed ring of six phosphates or a hexamer of phosphate molecules.

In some aspects, the phosphate may be of a series or grouping of base units of $HPO_3$, such that the units link together through a common oxygen to form a polyphosphate of $[HPO_3]_n$. In certain aspects n may be of 2 to 6, including 3, 4, and 5. The polyphosphates may be hexa, tetra, tri, or salts of a metaphosphoric acid. Sodium hexametaphosphate (SHMP) refers to a salt of composition $Na_6[(PO_3)_6]$ also known as Graham's salt, hexasodium metaphosphate and Metaphosphoric, hexasodium salt. An inorganic phosphate may further include salts such as dipotassium phosphate and disodium phosphate. In certain aspects, the inorganic phosphates include at least one or more of sodium hexametaphosphate (SHMP) and sodium tripolyphosphate (STPP).

In some aspects, the present disclosure concerns a phosphate scaffold for an SPL and/or an SML that is a mixture of two or more inorganic phosphates. As identified herein, phosphates may link in a branched manner or a chained manner or a combination thereof. As further identified herein, the phosphates may link together through a shared oxygen. With each phosphate providing or capable of providing three oxygens, the phosphates can link together through regular and irregular arranged connections. In some aspects, the combining two or more different types of phosphate may provide further structure to the scaffold by allowing further branching and or chain formation. In some aspects, the combination of two or more inorganic phosphates may provide for an irregular scaffold connecting two differently structured phosphates.

In some aspects, the present disclosure concerns a scaffold of hexametaphosphate. In some aspects, the structured metal luminophore may include SHMP. In further aspects, the structured metal luminophore may include SHMP and at least one further inorganic phosphate. In further aspects, the present disclosure provides a structure metal luminophore of SHMP and two or more further inorganic phosphates. In some aspects, the inorganic phosphate may include SHMP and one or more mono- or poly-phosphoric acids, including pyrophosphate, tripolyphosphate, tetrapolyphosphate, and metaphosphoric acids. In some aspects, the phosphate component of the SML may include of about 99.9% by weight to about 10% by weight of SHMP, including about 99.8, 99.7, 99.6, 99.5, 99.4, 99.3, 99.2, 99.1, 99, 98, 97, 96, 95, 94, 93, 92, 91, 90, 89, 88, 87, 86, 85, 84, 83, 82, 81, 80, 79, 78, 77, 76, 65, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, and 11% by weight of SHMP. In further aspects, the SML may include an inorganic phosphate component of about 0.1 to about 80% by weight of at least one further inorganic phosphate, including about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, and 79% by weight of at least one further inorganic phosphate.

In further aspects, the inorganic phosphate component of the SPL or SML may include both SHMP and STPP.

In further aspects, the inorganic phosphate component may include SHMP of a certain purity, wherein the purity refers to the percentage of the SHMP wherein the phosphates are arranged as a hexamer. As identified herein, phosphates may link in irregular and regular arrangements. In some aspects, the inorganic phosphate component includes a preparation of SHMP wherein from about 10 to about 99.9% of the SHMP is arranged as a hexamer, including 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, and 99.8% of the SHMP is arranged as a hexamer.

In some aspects, the inorganic phosphate component may include of about 0.1 to about 40% of STPP, including about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, and 39% STPP. In some aspects, STPP may be an impurity in a preparation of SHMP or may be added to SHMP or a combination thereof, such that the total of STPP within the inorganic phosphate component is of about 0.1 to about 40% by weight. In further aspects, the inorganic phosphate component may be of about 0.1 to about 40% by weight of STPP and at least one further inorganic phosphate.

In some aspects, the structured phosphate luminophore may include a metal component to form an SML, such that the scaffold acts as a ligand to the metal and retains the metal component in place within the overall structure. In some aspects, the metal component may be of one or more metals retained by the phosphate scaffold. Suitable metal components may include one or more of manganese, zinc and calcium. In certain aspects, the metal component may be a mixture of manganese and calcium, manganese and zinc, or manganese and zinc and calcium. In some aspects, the manganese may be of about 100 to about 1% of the total metal component by weight, including about 99, 98, 97, 96, 95, 94, 93, 92, 91, 90, 89, 88, 87, 86, 85, 84, 83, 82, 81, 80, 79, 78, 77, 76, 65, 74, 73, 72, 71, 70, 69, 68, 67, 66, 65, 64, 63, 62, 61, 60, 59, 58, 57, 56, 55, 54, 53, 52, 51, 50, 49, 48, 47, 46, 47, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, and 2% by weight of the total metal component. In other aspects the metal component may be of about 1 to about 100% by weight calcium and/or zinc, including about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99% by weight of the total metal component.

In some aspects, the present disclosure concerns an SML with the phosphate component and a metal component. In some aspects, the phosphate component may be of about 3 to about 99% by weight of the total SML, including about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 69, 97, and 98% by weight of the SML. In some aspects, the phosphate component may be of about 50 to about 90% by weight of the SML. In some aspects, the metal component may be out about 0.1 to about 99% by weight of the SML, including about 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 69, 97, and 98% by weight of the SML. In other aspects, the metal component may be of about 4 to about 20% by weight of the SML. In certain aspects, the metal component may include of about 0.1 to about 99% by weight of the SML manganese. In other aspects, the metal component may include manganese of about 4 to about 20 percent by weight of the SML. In other aspects, the metal component may be of about 1 to about 20 percent by weight of other metals including zinc and/or calcium, including about 2, 3, 4, 5, 6, 7, 8, 9, 10, 11, 12, 13, 14, 15, 16, 17, 18, and 19% by weight of the SML. In certain aspects the SML is of about 4 to about 20% by weight manganese and of about 1 to about 20% by weight zinc and/or calcium.

METHODS OF PREPARING

In some aspects, the present disclosure concerns methods for preparing the SPLs and SMLs as set forth herein. In some aspects, the SPLs can be prepared or assembled by adding the inorganic phosphates to an aqueous solution to allow for assembly of the scaffold. In some aspects, the SMLs can be prepared or assembled by adding the inorganic phosphates and the metal component to an aqueous solution to allow for association of the metal component with its ligand scaffold. In some aspects, the metal component can be prepared by adding in a metal salt in a premix alone or in combination to an aqueous solution and then contacting the aqueous solution with the phosphates. For example, calcium acetate, manganese acetate, manganese perchlorate hexahydrate, and/or zinc acetate can be prepared in water and then mixed in with SHMP also already in a water solution or with SHMP and STPP. The two can then be allowed to interact for a period of time and at ambient temperature. In some aspects, the inorganic phosphates may be pre-mixed in a slightly acidic solution. In some aspects, the inorganic phosphate components or the inorganic phosphate components and the metal components may be incubated together with added agitation, such as stirring or shaking of the mixed solutions. Following a period of time of from about 1 minute to about 2 hours, including about 5, 10, 15, 20, 30, 40, 50, 60, 70, 80, 90, 100, and 110 minutes, the mixed solutions can optionally be placed over a filter paper or similar retaining porous material and washed further with fresh water and/or alcohol, such as methanol. The assembled SPL or SML may then be optionally dried either in ambient air or with added heat of from about 35 to about 75° C., including about 40, 45, 50, 55, 60, 65, and 70° C. Further, the assembled SPL or SML may be then ground and selected for a desired size, such as through mesh size selection.

METHODS OF USING

In other aspects, the present disclosure concerns methods of utilizing the SPLs and/or SMLs as described herein. As identified herein, the metal component of the SML can react with a proximal free radical or peroxide, which in turn leads to emission of detectable luminescence from the SML. As used herein, a free radical refers to a molecule with an unpaired electron that as a result is unstable and highly reactive. Free radicals may include reactive oxygen species or reactive nitrogen species. Reactive oxygen species include peroxides because of the peroxide electron receptivity and its ability to form hydroxy radicals.

Accordingly, the present disclosure concerns methods for monitoring for and/or detecting the presence of a free radical or peroxide in proximity to the assembled SPL and/or SML. The methods may including exposing the SPL and/or SML to a free radical or peroxide or placing the SPL and/or SML in an environment or surrounding where generation of free radicals or peroxides is likely or suspected. For example, by placing the SML in an environment prone to the presence of free radicals or peroxides or wherein detection of free radicals or peroxides is desired, the reaction with the metal component and the free radical or peroxide generates a detectable signal than can be collected and/or quantitated to alert a user of the presence and/or quantity of free radicals or peroxides in the environment proximal to the SML. Detection and/or quantification of the luminescing SML can be achieved with devices understood in the art, including photomultiplier tubes, light detecting diodes, luminometers, fluorescence meters, and photometers (not a complete list with new types of light detection being currently developed).

In certain aspects, the present disclosure concerns application of the SPLs and/or SMLs in an edible fats & oil, lipids, and petrochemicals. The presence of free radicals or peroxides in edible oils can be severely detrimental to the edible oil and the detection thereof provides an opportunity for early detection of spoiling of large volumes of edible oils. In some aspects, the present disclosure concerns a method for monitoring or detecting for the presence of a free radical or peroxide within an edible oil by contacting or administering the SPLs and/or SMLs as set forth herein to an edible oil sample and monitoring and/or detecting for the presence of luminescence from the metal components therein. In some aspects, a luminescence detector can be placed in or next to the edible oil container. In some aspects, the present disclosure concerns constant or intermittent detection and/or monitoring of luminescence in an edible oil, wherein an increase in luminescence over a baseline or initial value alerts a user of the increase of free radicals or peroxides within the edible oil.

Figure 2:
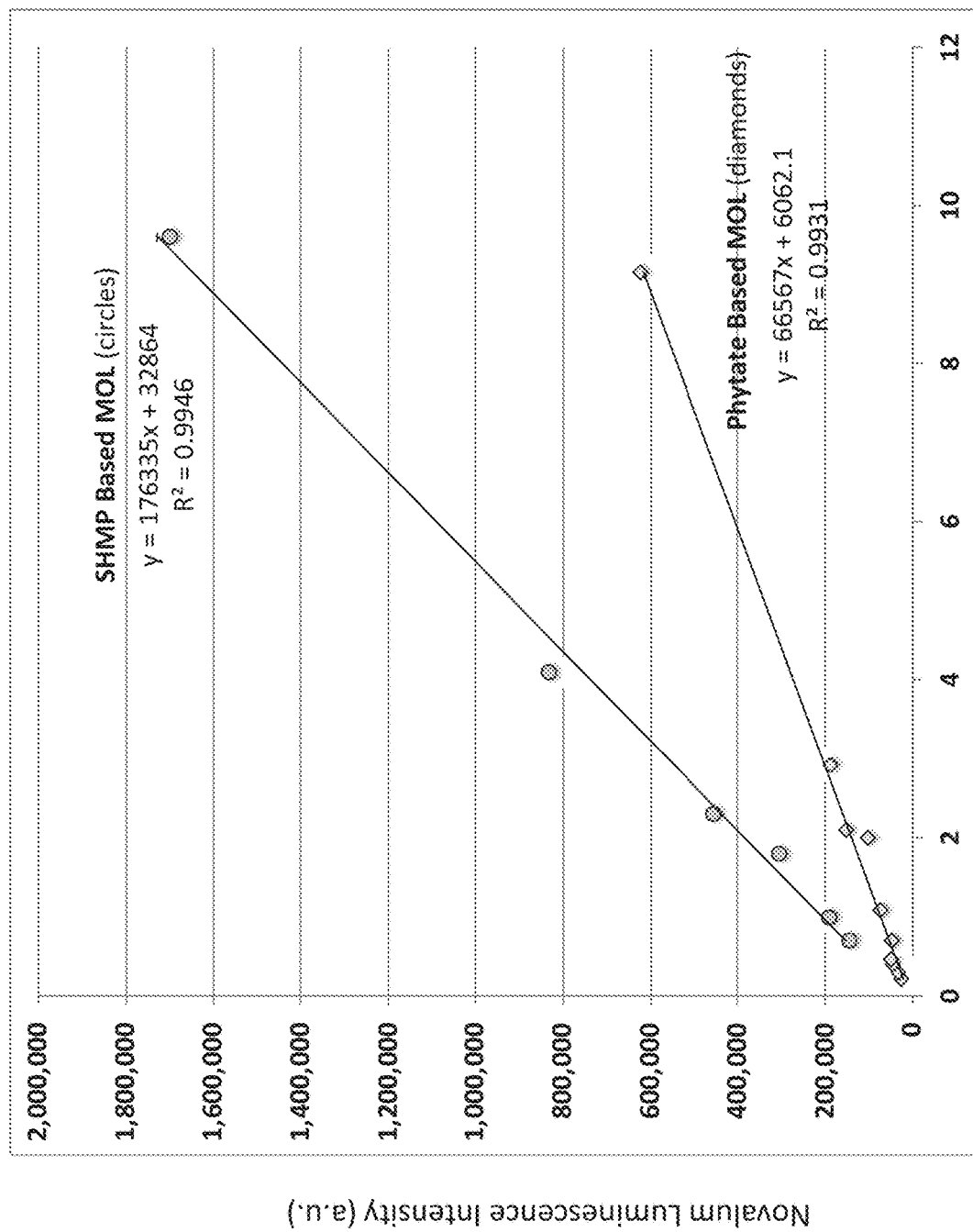
FIG. 2 shows a plot of luminescence intensity vs peroxide value from structured metal phosphate luminophore (MPL) sensors prepared with phytic acid (diamonds) and sodium hexametaphosphate (SHMP) (circles). Phytic acid data=20 mg of MPL per 0.4 mLs oil at 45° C.; SHMP data=10 mg of MPL per 0.4 mLs oil at 22° C. Both data sets were obtained using the same Novalum luminometer (Charm Sciences, Lawrence, MA).
Figure 3:
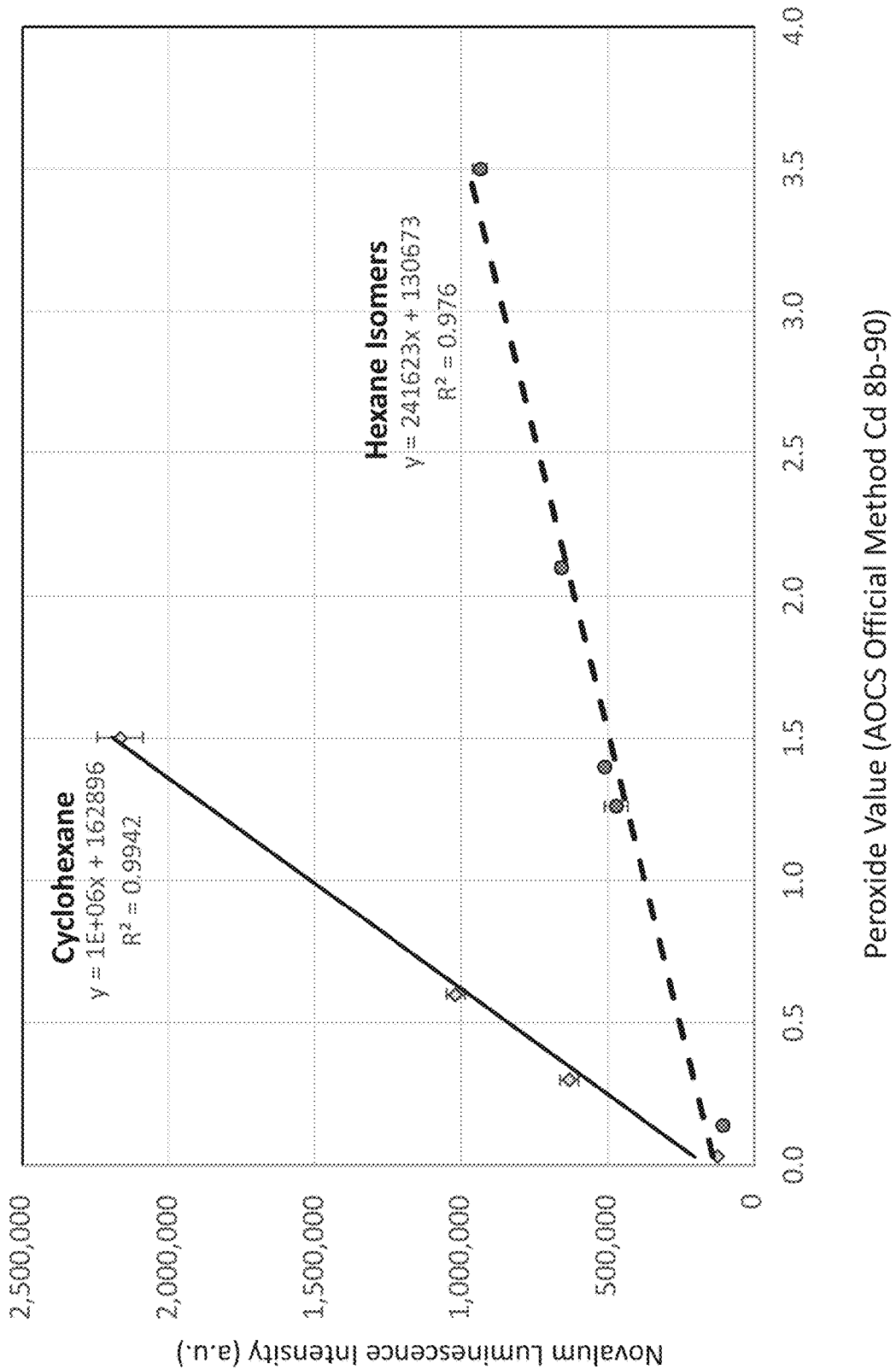
FIG. 3 shows a plot of luminescence intensity at ca. 10 seconds after mixing 400 µL of either oxidized cyclohexane dilutions (solid line) or oxidized hexane isomers dilutions (dashed line) with 10 mg of structured metal phosphate luminophore (MPL) sensor. All materials are at 22 degrees C. Luminescence is measured with a Charm Sciences Novalum luminometer. Error bars show standard errors (n=3). The "peroxide value" of the cyclohexane and hexane isomers were measured using AOCS Official method Cd 8b-90 at 1.49 and 3.50, respectively. Dilutions were made with pentane and PV of dilutions were calculated.

In some aspects, the SPLs and/or SMLs as set forth herein can detect free radicals or peroxides in a hydrocarbon solution. As shown in FIG. 3 the emission intensity for hydrocarbons can vary depending on the structure of the hydrocarbon, likely due to the differences in the nature of interaction between the SML and the particular hydrocarbon and hydrocarbon hydroperoxide. Further, as seen in comparison with FIG. 1 and FIG. 2, both the cyclohexane hydroperoxide and hexane hydroperoxides produce a rapid response and corresponding higher luminescence emissions compared to the edible oils of similar peroxide value. The luminescence from both hydrocarbons were measured as soon as possible (ca. 10 seconds) after mixing the substrate and sensor material. The edible oils were measured at 1.5 minutes and exhibit a gradual rise in luminescence emissions peaking at about 1.5 minutes before beginning to decline. Gas chromatography/mass spectroscopy of the cyclohexane sample with peroxide value of 1.5 revealed a predominance of cyclohexane-hydroperoxide with a small amount of cyclohexanone (ratio ca 7:1 respectively). Mineral oil hydroperoxides exhibits a similar rapid burst of luminescence and subsequent decline as the cyclohexane hydroperoxide and hexane hydroperoxide samples.

EXAMPLES

Example 1 Preparation of Metal-Phosphate Luminophore Sensors With a Hexametaphosphate Scaffold Briefly, mix 100 mLs water, 12 grams of sodium hexametaphosphate (ca. 99%) and adjust pH to 6.8. Prepare premix of by combining 39 mLs water with 6.2 grams calcium acetate and 1 g manganese acetate. Add premix to SHMP mixture and stir for 30 min. Filter through filter paper (e.g., Whatman no. 42). Wash with 100 mLs water and then rinse with small amount of methanol (e.g., 25 mLs). Dry at 60 degrees C. for 20 min, and store over silica gel desiccant overnight. Grind and sieve (e.g., less than or equal to 40 mesh).

Example 2 Preparation of Metal-Phosphate Luminophore Sensors With a Hexametaphosphate Scaffold Briefly, mix 100 mLs water, 12 grams of sodium hexametaphosphate (ca. 99%). Prepare premix of by combining 39 mLs water with 8 grams zinc acetate and 1 g manganese acetate. Add premix to SHMP mixture and stir for 30 min. Filter through filter paper (e.g., Whatman no. 42). Wash with 100 mLs water and then rinse with small amount of methanol (e.g., 25 mLs). Dry at 60 degrees C. for 20 min, and store over silica gel desiccant overnight. Grind and sieve (e.g., less than or equal to 40 mesh).

Example 3 Preparation of Metal-Phosphate Luminophore Sensors With a Hexametaphosphate Scaffold Briefly, mix 100 mLs water, 12 grams of sodium hexametaphosphate (ca. 70%). Prepare premix of by combining 39 mLs water, 6 grams of zinc acetate and 3 g manganese acetate. Add premix to SHMP mixture and stir for 30 min. Wash with 300 mLs water and then rinse with small amount of methanol (e.g., 25 mLs) to assist with drying/moisture removal. Dry at 60 degrees C. for 20 min, and store over silica gel desiccant overnight. Grind and sieve (e.g., less than or equal to 40 mesh).

Example 4 Preparation of Metal-Phosphate Luminophore Sensors With a Hexametaphosphate Scaffold Briefly, mix 100 mLs water, 7 grams of sodium hexametaphosphate (ca. 70%) and 5 grams sodium tripolyphosphate. Prepare premix of by combining 39 mLs water, 6 grams of calcium acetate and 3 g manganese acetate. Add premix to SHMP mixture and stir for 30 min. Wash with 300 mLs water and then rinse with small amount of methanol (e.g., 25 mLs) to assist with drying/moisture removal. Dry at 60 degrees C. for 20 min, and store over silica gel desiccant overnight. Grind and sieve (e.g., less than or equal to 40 mesh).

Example 5 Preparation of Metal-Phosphate Luminophore Sensors With a Hexametaphosphate Scaffold Briefly, mix 100 mLs water, 7 grams of sodium hexametaphosphate (ca. 70%) and 5 grams sodium tripolyphosphate. Prepare premix of by combining 39 mLs water, 6 grams of zinc acetate and 3 g manganese perchlorate hexahydrate. Add premix to SHMP mixture and stir for 30 min. Wash with 100 mLs water and then rinse with small amount of methanol (e.g., 25 mLs) to assist with drying/moisture removal. Dry at 60 degrees C. for 20 min, and store over silica gel desiccant overnight. Grind and sieve (e.g., less than or equal to 40 mesh).

Example 6 Preparation of Metal-Phosphate Luminophore Sensors With a Hexametaphosphate Scaffold Briefly, mix 100 mLs water, 7 grams of sodium hexametaphosphate (ca. 70%) and 5 grams sodium tripolyphosphate. Prepare premix of by combining 39 mLs water, 6 grams of calcium acetate and 3 g manganese perchlorate hexahydrate. Add premix to SHMP mixture and stir for 30 min. Wash with 100 mLs water and then rinse with small amount of methanol (e.g., 25 mLs) to assist with drying/ moisture removal. Dry at 60 degrees C. for 20 min, and store over silica gel desiccant overnight. Grind and sieve (e.g., less than or equal to 40 mesh).

Example 7 Preparation of Metal-Phosphate Luminophore Sensors With a Hexametaphosphate Scaffold Briefly, mix 100 mLs water, 7 grams of sodium hexametaphosphate (ca. 70%) and 5 grams sodium tripolyphosphate. Prepare premix of by combining 39 mLs water with 6 grams manganese acetate. Add premix to SHMP mixture and stir for 30 min. Filter through filter paper (e.g., Whatman no. 42). Wash with 100 mLs water and then rinse with small amount of methanol (e.g., 25 mLs). Dry at 60 degrees C. for 20 min, and store over silica gel desiccant overnight. Grind and sieve (e.g., less than or equal to 40 mesh).

Example 8 Preparation of Metal-Phosphate Luminophore Sensors With a Hexametaphosphate Scaffold Briefly, mix 100 mLs water, 12 grams of sodium hexametaphosphate (ca. 70%) with 6 gram of manganese acetate. Stir for 30 minutes, filter through filter paper (e.g., Whatman no. 42). Wash with 100 mLs water and then rinse with small amount of methanol (e.g., 25 mLs). Dry at 60 degrees C. for 20 min, and store over silica gel desiccant overnight. Grind and sieve (e.g., less than or equal to 40 mesh).

The foregoing description of several aspects has been presented for purposes of illustration. It is not intended to be exhaustive or to limit the application to the precise forms disclosed, and obviously many modifications and variations are possible in light of the above teaching. It is understood that the disclosure may be practiced in ways other than as specifically set forth herein without departing from the scope of the disclosure. Any patents or publications mentioned in this specification are incorporated herein by reference to the same extent as if each individual publication is specifically and individually indicated to be incorporated by reference.

I claim:

1. A structured phosphate luminophore (SPL) or structured metal luminophore (SML) comprising a phosphate scaffold, wherein the phosphate scaffold comprises sodium hexa metaphosphate (SHMP).

2. The SPL or SML of claim 1, wherein the phosphate scaffold further comprises sodium tripolyphosphate (STPP).

3. The SPL or SML of claim 2, further comprising a metal component.

4. The SPL or SML of claim 1, further comprising a metal component.

5. The SPL or SML of claim 4, wherein the metal component is selected from zinc, calcium, manganese or a combination thereof.

6. The SPL or SML of claim 4, wherein the phosphate scaffold is provided at 3.0-99.0 weight percent of the SPL or SML and the metal component is provided at 0.1-99.0 weight percent of the SPL or SML.

7. The SPL or SML of claim 6, wherein the phosphate scaffold is provided at 50 to 90 weight percent of the SPL or SML.

8. The SPL or SML of claim 7, wherein the metal component is provided at 4 to 40 weight percent of the SPL or SML.

9. The SPL or SML of claim 2, wherein the metal component comprises manganese and at least one of zinc and/or calcium.

10. The SPL or SML of claim 9, wherein the phosphate scaffold is provided at 3.0 to 99.0 weight percent of the SML, manganese is provided at 0.1 to 99.0 weight percent of the SPL or SML and the at least one of zinc and/or calcium is provided atl to 16 weight percent of the SPL or SML.

11. The SPL or SML of claim 10, wherein the phosphate scaffold is provided at 50 to 90 weight percent of the SPL or SML.

12. The SPL or SML of claim 10, wherein manganese is provided at 4 to 40 weight percent of the SPL or SML.

13. A method for monitoring and/or detecting and/or quantifying the presence of a free radical or peroxide in an environment comprising:

placing the SPL or SML of claim 1 in the environment;

exposing the SPL or SML to the free radical or peroxide in the environment; and detecting with a detector electromagnetic radiation emitted from the SPL or SML when the free radical or peroxide is in proximity to the SPL or SML.

14. The method of claim 13, wherein the environment is a container of edible fat, edible oil, lipids or petrochemicals.

15. The method of claim 12, wherein the detector is selected from a luminometer, a fluorescence meter, a photometers, or a combination thereof.

16. A hydrocarbon solution comprising the SPL or SML of claim 1.

17. The hydrocarbon solution of claim 16, wherein the solution comprises at least one of an edible oil, an edible fat, a lipid, or a petrochemical.

* * * * *